United States Patent [19]
Matsumoto et al.

[11] Patent Number: 5,765,368
[45] Date of Patent: Jun. 16, 1998

[54] EXHAUST GAS PURIFICATION BY GAS REACTION IN EXHAUST CATALYST

[75] Inventors: Toshiki Matsumoto, Kariya; Kinji Hodaira, Okazaki, both of Japan

[73] Assignee: Denso Corporation, Kariya, Japan

[21] Appl. No.: 735,053

[22] Filed: Oct. 23, 1996

[30] Foreign Application Priority Data

Oct. 26, 1995 [JP] Japan .................................. 7-278926

[51] Int. Cl.$^6$ .................................................. F01N 3/20
[52] U.S. Cl. .................. 60/274; 60/284; 60/285; 60/289
[58] Field of Search .................. 60/274, 284, 285, 60/286, 289

[56] References Cited

U.S. PATENT DOCUMENTS

| | | | |
|---|---|---|---|
| 4,209,981 | 7/1980 | Miyamori et al. | 60/284 X |
| 5,184,463 | 2/1993 | Becker et al. | 60/284 |
| 5,483,946 | 1/1996 | Hamburg et al. | 60/284 X |
| 5,501,073 | 3/1996 | Miyashita et al. | 60/284 |
| 5,537,321 | 7/1996 | Yoshizaki et al. | 60/284 X |
| 5,577,383 | 11/1996 | Kuroda et al. | 60/284 |

FOREIGN PATENT DOCUMENTS

| | | |
|---|---|---|
| 60-88870 | 5/1985 | Japan . |
| 60-261949 | 12/1985 | Japan . |
| 3-15637 | 1/1991 | Japan . |
| 3-202613 | 9/1991 | Japan . |
| 5-18235 | 1/1993 | Japan . |

*Primary Examiner*—Tony M. Argenbright
*Attorney, Agent, or Firm*—Cushman Darby & Cushman IP Group of Pillsbury Madison & Sutro LLP

[57] ABSTRACT

In an engine, if a catalytic converter is not in the activated region, a fuel injection rate is corrected to increase, and a secondary air is introduced from a secondary air feed port into a catalytic converter. Even immediately after the cold start of the engine, the fuel injection rate is increased to be richer in fuel than the stoichiometric air/fuel ratio to feed the secondary air simultaneously, so that the temperatures of the catalytic converter and the exhaust gas can be kept over the activation temperature by the heat of the reaction of the increased fuel in the catalytic converter thereby to improve the exhaust gas purification.

6 Claims, 7 Drawing Sheets

FIG. 2A
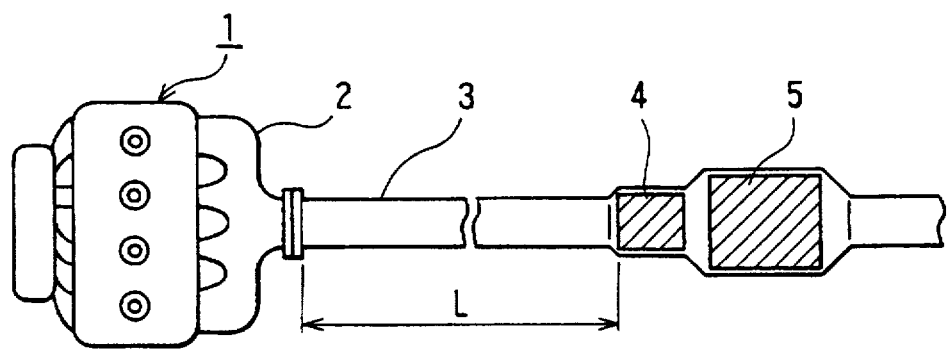
FIG. 2B
FIG. 2C
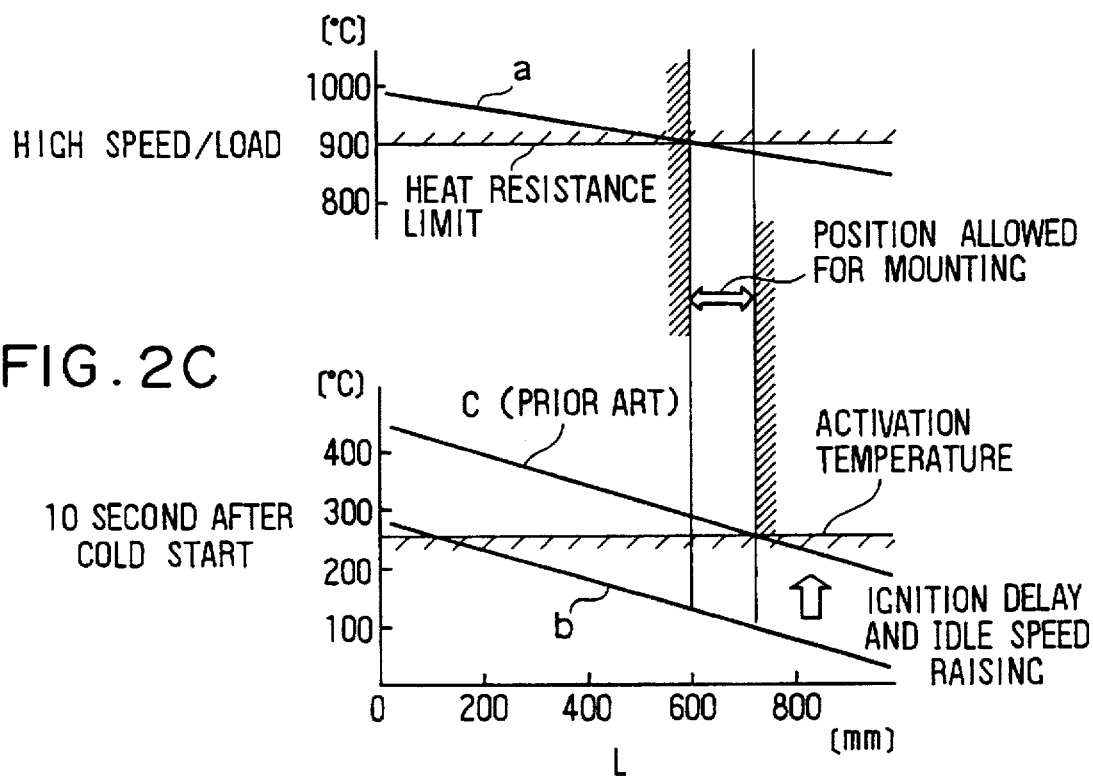

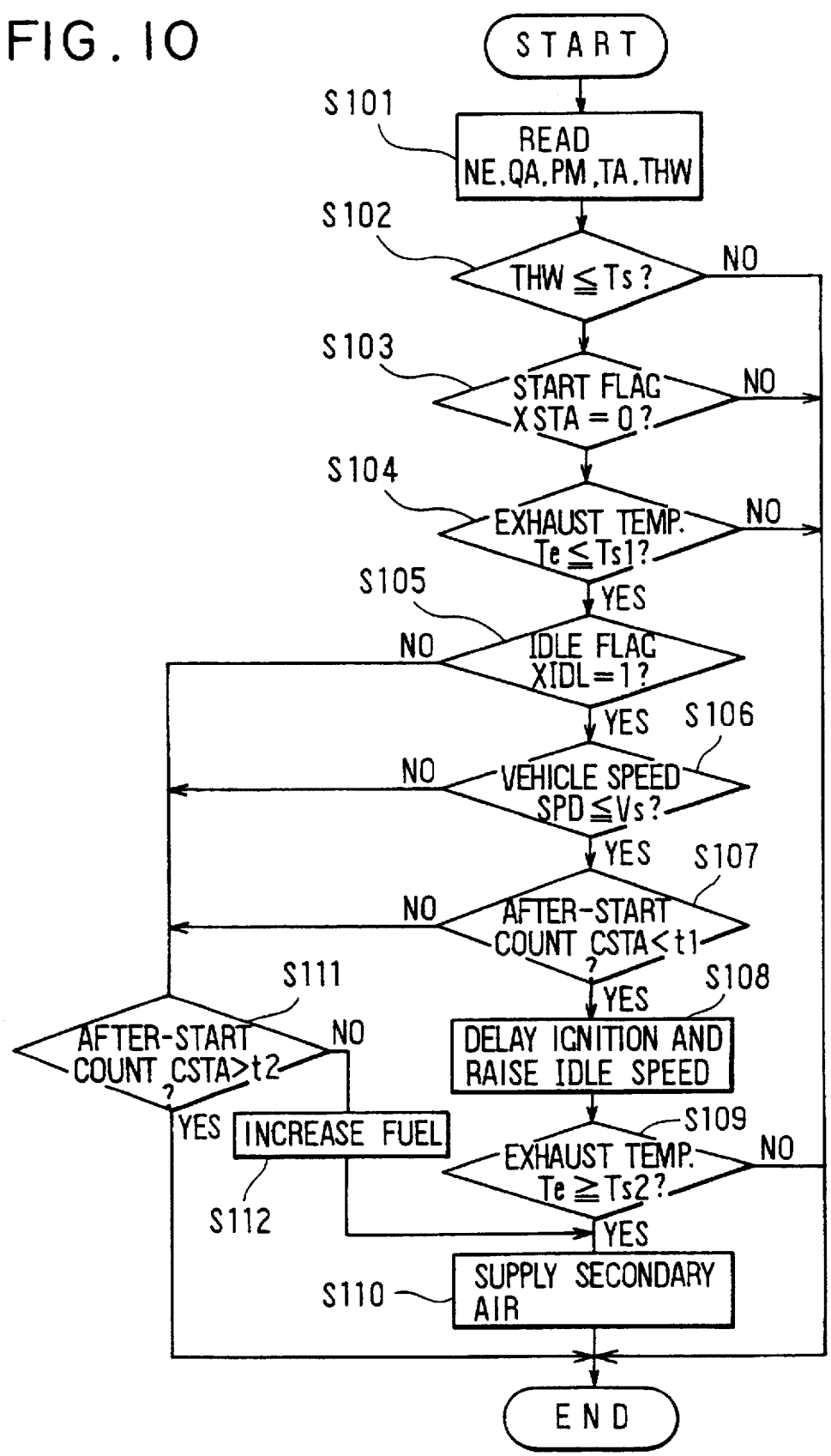

EXHAUST GAS PURIFICATION BY GAS REACTION IN EXHAUST CATALYST

BACKGROUND OF THE INVENTION

1. Field of the Invention:

The present invention relates to an exhaust gas purification system and method for an internal combustion engine, which can activate a catalytic converter quickly just after the start of the internal combustion engine at an engine cold start thereby to improve the exhaust gas purification.

2. Description of Related Art:

In order to activate a catalytic converter early just after the cold start of an internal combustion engine to retain the exhaust gas purification, it is conceivable to arrange the catalytic converter in the vicinity of the exhaust manifold which is connected just downstream the exhaust port of the internal combustion engine. If, however, the temperature of the exhaust gas to flow into the catalytic converter exceeds the general heat resisting temperature of 850° to 900° C. of the catalyst when in a high speed/load running state, the catalyst is thermally deteriorated by the overheat.

For solving this problem, two systems are proposed by Japanese Patent Laid-Open No. 202613/1991 or 88870/1985 are proposed. In the former system, a small-sized catalytic converter of small heat capacity, as excellent in an early temperature activity, is arranged at a position relatively remote from the exit of the exhaust manifold, and a main catalytic converter of large capacity is arranged downstream the former one so as to avoid the overheat of the catalytic converter and to retain the exhaust gas purification at the cold engine time. In the latter system, on the other hand, the exhaust gas temperature is raised at the cold engine time by the well-known ignition angle delay control and idle speed raising control thereby to activate the catalytic converter early.

In the above-described systems, the exhaust gas temperature may become lower than the activation temperature of the catalyst if a low speed/load run continues even once the catalytic converter is activated after the engine start. That is, the catalytic converter of small heat capacity, as located at the most upstream position, sensitively follows the exhaust gas temperature because of its small heat capacity so that it cannot keep the active state. If the ignition angle is delayed during the run, moreover, the output torque of the engine lowers to deteriorate the running performance, thus causing a problem that the practicability is poor.

SUMMARY OF THE INVENTION

Thus, the present invention has an object to provide an exhaust gas purification system and method for an internal combustion engine, which is capable of keeping the exhaust gas purification by activating a catalytic converter early immediately after the cold start of the internal combustion engine.

According to an exhaust gas purification system and method for an internal combustion engine of the present invention, the internal combustion engine is fed with the fuel injection rate which is calculated on the basis of running state of the internal combustion engine, as detected in terms of various parameters of the internal combustion engine. If, in the running state of the internal combustion engine, the catalytic converter disposed midway of an exhaust passage is not in a predetermined active region for the predetermined temperature/purification characteristics, the calculated fuel injection rate is corrected to increase, and the secondary air flow to be fed to the catalytic converter is controlled. As a result, even just after the cold start of the internal combustion engine, the fuel injection rate is increased with respect to the stoichiometric air/fuel ratio simultaneously as a portion of the catalytic converter reaches the activation temperature, and the secondary air flow is fed so that the catalytic converter and the exhaust gas temperature can be kept over the activation temperature by the heat of reaction of the increased fuel in the catalytic converter.

Preferably, the air/fuel ratio of the exhaust gas to be fed into the catalytic converter is set in the vicinity of the stoichiometric value, that is, the air excess factor is kept within a range of 1.0 to 1.1. As a result, the secondary air flow for the increase in the fuel to be injected into the catalytic converter is optimized to activate the catalytic converter quickly and to improve the exhaust gas purification.

Preferably, the corrected increase in the fuel injection rate is either calculated on the basis of the running state of the internal combustion engine or calculated from a predetermined map value. On the other hand, the secondary air flow is an estimated value which is either sequentially controlled on the basis of the running state of the internal combustion engine or calculated from a predetermined map value. As a result, the fuel injection increase and the accompanying secondary air flow are properly set to improve the exhaust gas purification by either the sequentially calculated value based upon the running state of the internal combustion engine or the map value.

Preferably, one of a noble metal of palladium group, platinum or a noble metal of rhodium group, or its mixture or compound is carried as the catalyst component on the carrier surface of the catalytic converter. This catalytic converter made of such catalyst component can be quickly activated to purify the noxious content in the exhaust gas efficiently.

More preferably, the catalytic converter is small-sized to have a small heat capacity, and a catalytic converter of large heat capacity is arranged just downstream the former. As a result, the catalytic converter at the upstream stage is quickly activated even at the cold start to keep itself and the exhaust gas temperature at the activation temperature of the catalyst, and the noxious component of the exhaust gas from the internal combustion engine is purified to an optimum by the catalytic converter at the downstream stage.

BRIEF DESCRIPTION OF THE DRAWINGS

Other objects, features and advantages of the present invention will become more apparent from the following detailed description when read in conjunction with the accompanying drawings, in which:

FIGS. 2A to 2C are explanatory diagrams illustrating relations between the mounting position of a catalytic converter and an exhaust gas temperature in the exhaust gas purification system according to one embodiment of the present invention;

FIG. 10 is a flow chart showing a processing procedure of an ECU, as used in the exhaust gas purification system.

DETAILED DESCRIPTION OF PRESENTLY PREFERRED EMBODIMENT

The present invention will be described in further detail in connection with one embodiment.

Figure 1:
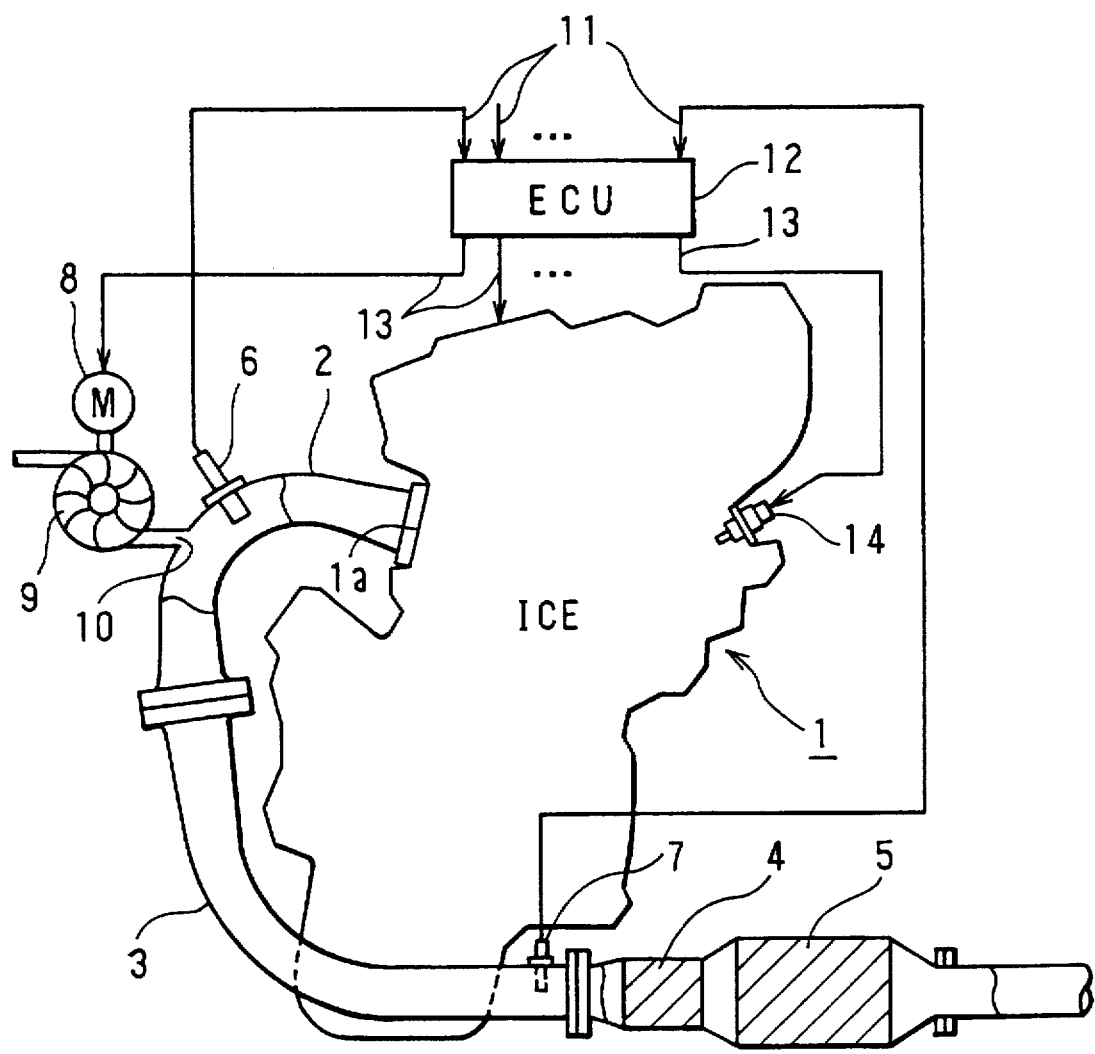
FIG. 1 is a schematic diagram showing a construction of an exhaust gas purification system for an internal combustion engine according to one embodiment of the present invention.

In FIG. 1 showing a construction of an exhaust gas purification system for an internal combustion engine, to an exhaust port 1a of an internal combustion engine (ICE) 1, as shown in FIG. 1, there are connected an exhaust manifold 2 and an exhaust pipe 3. Downstream of these, there is arranged a small-sized catalytic converter 4 of small heat capacity, which is immediately followed by a catalytic converter 5 of large capacity. In the exhaust manifold 2, there is arranged an $O_2$ sensor 6 for detecting the oxygen concentration in the exhaust gas. In the vicinity of the exit of the exhaust pipe 3, there is arranged an exhaust temperature sensor 7 for detecting the temperature of the exhaust gas. In the vicinity of the exhaust manifold 2, on the other hand, there is disposed an electric air pump 9 which is driven by an electric motor 8, so that secondary air is fed from the air pump 9 through a secondary air feed port 10 into the exhaust gas in the exhaust manifold 2.

An ECU (Electronic Control Unit) 12 is used as an arithmetic logic circuit and is composed of a well-known central processing unit CPU, a ROM for storing a control program, a RAM for storing various data, an input/output circuit and a bus line for connecting the foregoing components. Various data 11, as coming from the $O_2$ sensor 6, the temperature sensor 7 and the not-shown various sensors, are read in and operated by the ECU 12 so that various signals 13 are outputted to an injector 14 and not-shown various actuators to control the running condition of the internal combustion engine 1. The calculation of the fuel injection rate (amount), as based upon the running condition of the internal combustion engine by the ECU 12, and the air/fuel ratio feedback control, as based upon the oxygen concentration signal indicating the oxygen concentration in the exhaust gas and coming from the $O_2$ sensor 6, are well known in the art so that a further description thereof is omitted for brevity.

Shown is FIGS. 2A to 2C are a relation between a distance L [mm] from the exit of the exhaust manifold 2 of the internal combustion engine 1 to the front end of the catalytic converter 4 in the exhaust gas purification system and an exhaust gas temperatures.

In a high speed/load running state, as indicated by solid line "a" in FIG. 2B, the heat release from the exhaust pipe 3 increases more so that the exhaust gas temperature lowers more, as the distance from the exit of the exhaust manifold 2 increases more. Hence, the distance L of the catalytic converter 4 from the exit of the exhaust manifold 2 where the catalytic converter 4 is mounted while being prevented from any excessive temperature rise and from any thermal deterioration is desired to be mounted downstream more than the distance L=600 [mm], at which the exhaust gas temperature is less than the heat resistance limit temperature of 850° to 900° C. of the catalytic converter 4, in the high speed/load running state.

Immediately after the cold start or in a low speed/load running state, on the other hand, the exhaust gas temperature is lowered more by the heat capacity of the exhaust pipe 3 as the distance L from the exit of the exhaust manifold 2 increases. At this distance L=600 [mm], as indicated by solid line "b" in FIG. 2C, ten seconds after the cold start, the exhaust gas temperature fails to rise to above 250° C or the activation temperature of the catalytic converter 4, so that an early activation is difficult immediately after the start. Thus, there has been proposed a system in which the catalytic converter 4 is early activated by raising the exhaust gas temperature, as indicated by solid line "c", in the idle state immediately after the engine start by delaying the ignition angle and by raising the idle speed.

If, however, the delay in the ignition angle and the rise in the idle speed are executed in the low speed/load running state immediately after the cold start, the temperature of the exhaust gas to flow into the catalytic converter 4 rises, but the concentration of the reacted component in the exhaust gas such as the HC (hydrocarbons) or CO (carbon monoxide) drops so that the reaction in the catalytic converter 4 after the catalyzation temperature is reached declines. As a result, it takes a long time for the catalytic converter 4 to be activated in its entirety, so that the effect of improving the exhaust gas purification is halved. If the delay of ignition angle is executed at a low running speed, on the other hand, the drivability may be deteriorated due to shortage of torque.

Figure 3A:
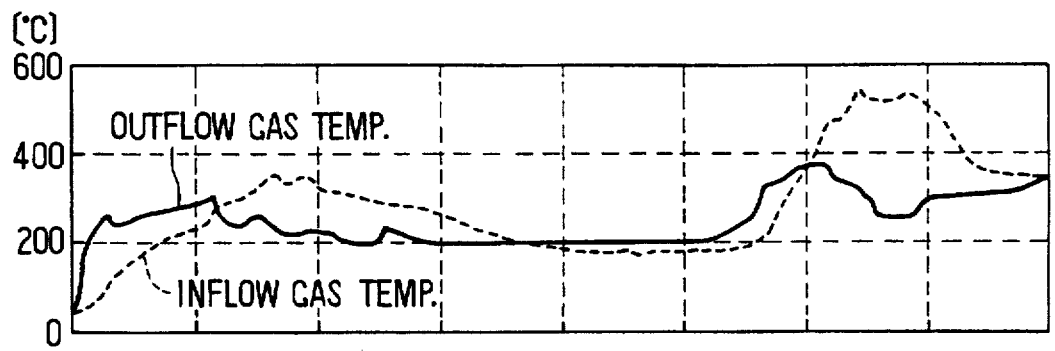
FIGS. 3A and 3B are state transition diagrams plotting an exhaust gas temperature immediately after a cold start of the internal combustion engine at the stage before the exhaust gas purification system is applied.
Figure 3B:
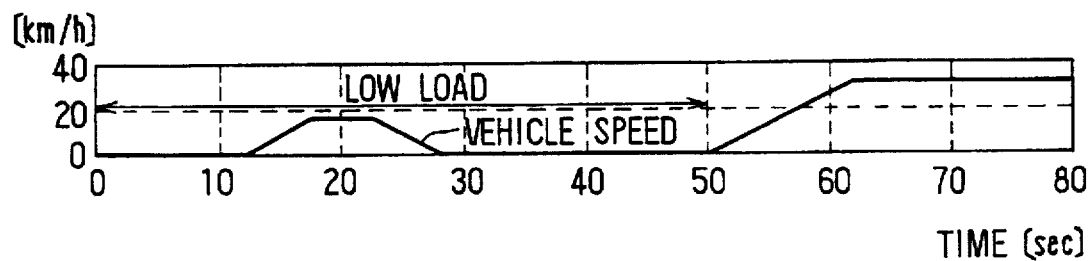

Actually measured data of the exhaust gas temperature behaviors upstream and downstream of the catalytic converter 4 immediately after the cold start when no fuel injection increasing control is executed in the exhaust gas purification system are shown in FIGS. 3A and 3B.

In the idle state immediately after the start, the catalytic converter 4 is activated for ten and several seconds by the delay in the ignition angle and the increase in the idle speed so that the outflow gas temperature of the catalytic converter 4 exceeds the inflow gas temperature. After this, the inflow gas temperature is lowered in the low speed/load running state after the release of the delay in the ignition angle and the increase in the idle speed, so that the catalytic converter 4 cannot keep its activated state.

In order to cope with this situation, according to the present embodiment, even in the low speed/load running state in which the exhaust gas temperature is below the activation temperature of the catalyst, the reaction in the catalytic converter 4 is promoted to keep the activated state by controlling the increase in the fuel injection rate and the feeding rate of the secondary air to the inside of the exhaust manifold in the vicinity of the exhaust port 1a of the internal combustion engine 1 or the exhaust passage upstream the catalytic converter 4.

In order to keep the activated state of the catalytic converter 4, the heat of reaction to be generated at the oxidations of the HC and the CO in the exhaust gas in the catalytic converter 4 is positively utilized. Here is taken an example of the reaction of the HC, which is subjected to an oxidation, as specified by the following formula (1), in the catalytic converter 4:

$$C_nH_m + (n+m/4)O_2 \rightarrow (m/2)H_2O + nCO_2 + q \; [J/mol] \tag{1}$$

wherein letter q designates the calorie to be generated for 1 [mol] of $C_nH_m$. It is assumed that the exhaust gas flow rate at the time of passing through the catalytic converter 4 is designated by f (mass flow rate); the specific heat of the exhaust gas is designated by c; the inflow gas temperature is designated by T0; the outflow gas temperature is designated by T1; and the purification factor of the HC of the catalytic converter 4 at this time is designated by $\eta$. If, moreover, the outflow gas temperature is warmed from T0 to T1 by the reaction calorie Q of the CnHm of N [mols] contained in the exhaust gas, the following formula (2) holds:

$$Q = \eta Nq = cf(T1-T0) \; [J] \; --- \; (2).$$

Hence, the number of moles of the $C_{nl\,Hhd\,m}$, as required for raising the exhaust gas temperature to $\Delta T = (T1-T0)$ at the time of passing through the catalytic converter 4 is calculated by the following equation (3):

$$N = cf\Delta T/(\eta rq) \; [mol] \; --- \; (3).$$

The exhaust gas temperature is raised from T0 to T1 when it passes through the catalytic converter 4, as described above. Specifically, in order to keep the catalytic converter 4 Activated, N[mol] of CnHm, as calculated by formula (3), is required. This requirement is satisfied by additionally feeding the increased amount of fuel to be injected as the unburned gas in the combustion chamber into the catalytic converter 4 and by feeding the oxygen necessary for the reaction in the form of the secondary air.

Here will be specifically described the optimization of the increase in the fuel injection rate with reference to the characteristic diagrams of FIGS. 4 to 8 in the exhaust gas purification system according to the present embodiment.

When the inflow gas temperature T0 to the catalytic converter 4 is at 200° C. or below the activation temperature of the catalyst, the relation between the increase $\Delta T$ in the fuel injection rate for the stoichiometric air/fuel and the outflow gas temperature T1 is given, as plotted in FIG. 5, from the foregoing formula (3) and the temperature purification characteristics of FIG. 4.

Figure 4:
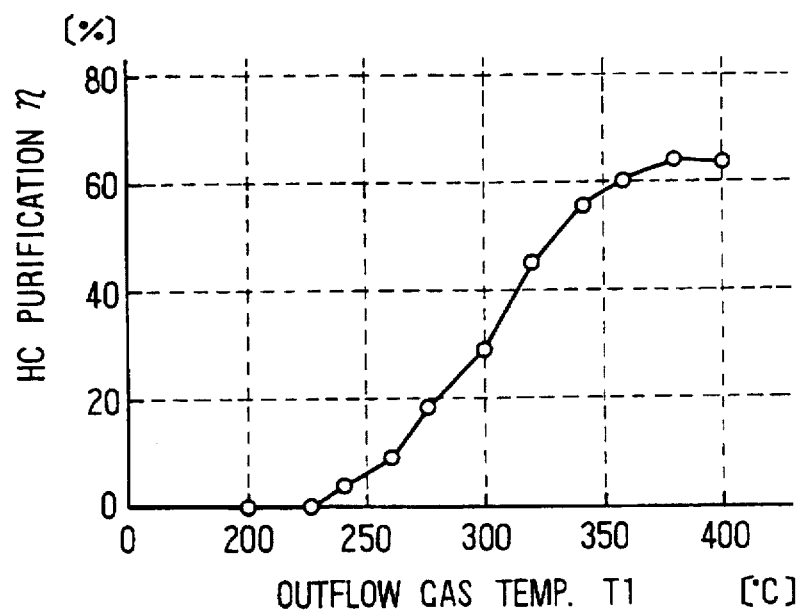
FIG. 4 is a characteristic diagram plotting an HC purification factor against the exhaust gas temperature of the catalytic converter to be used in the exhaust gas purification system.
Figure 5:
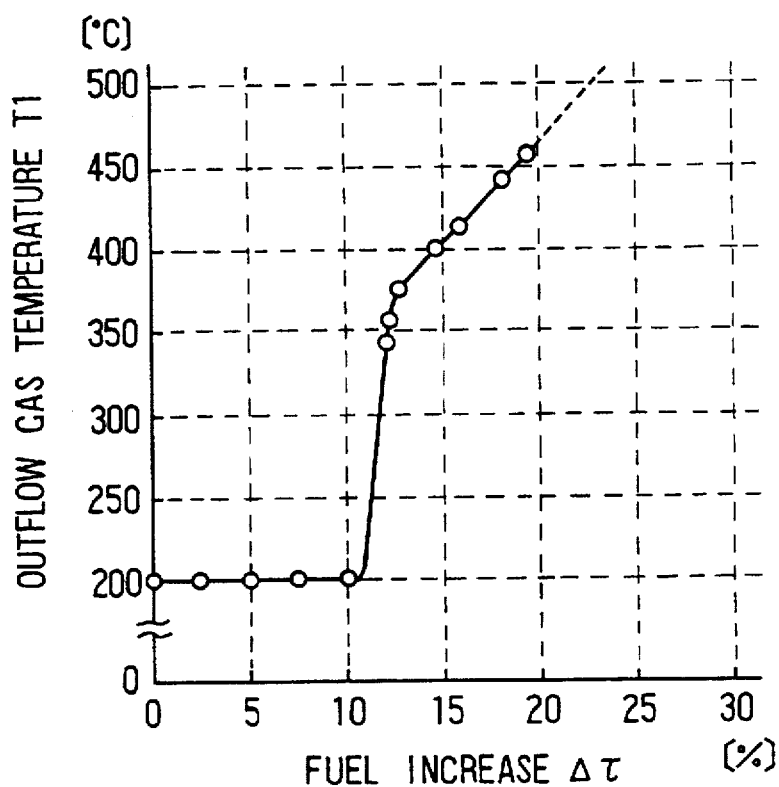
FIG. 5 is a characteristic diagram plotting the exhaust gas temperature against a fuel injection increase to be used in the exhaust gas purification.
Figure 6:
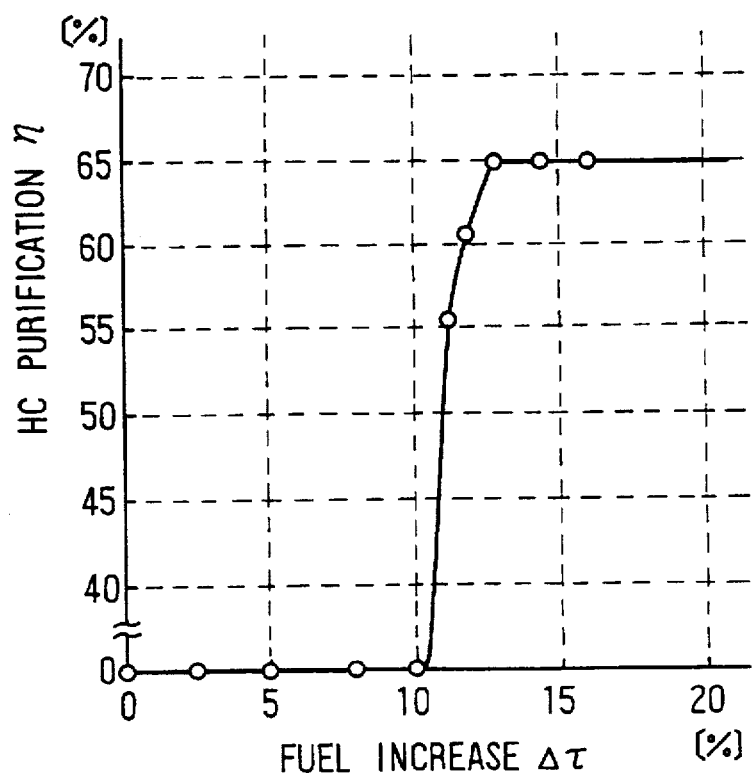
FIG. 6 is a characteristic diagram plotting the HC purification factor against a fuel injection increase to be used in the exhaust gas purification system.

Hence, the characteristics, as plotted in FIG. 6, is obtained if the relation between the fuel injection increase $\Delta \eta$ and the HC purification factor $\eta$ is deduced by eliminating the outflow gas temperature T1 from FIGS. 4 and 5. It is apparently seen from FIG. 6 that the HC purification factor $\eta$ of the catalytic converter 4 is given the $\eta$max (the maximum HC purification factor) or about 65% according to the present embodiment by setting the fuel injection increase $\Delta \tau$, and that the outflow gas temperature T1 at this time is about 380° C., as plotted in FIG. 5, which exceeds the activation temperature of the catalyst.

Here will be described a likelihood that the catalytic converter 4 is kept in the activated state by the fuel injection increase $\Delta \tau$ whereas this fuel injection increase $\Delta \tau$ itself invites the increase in the emission of the HC or the noxious content.

Figure 7:
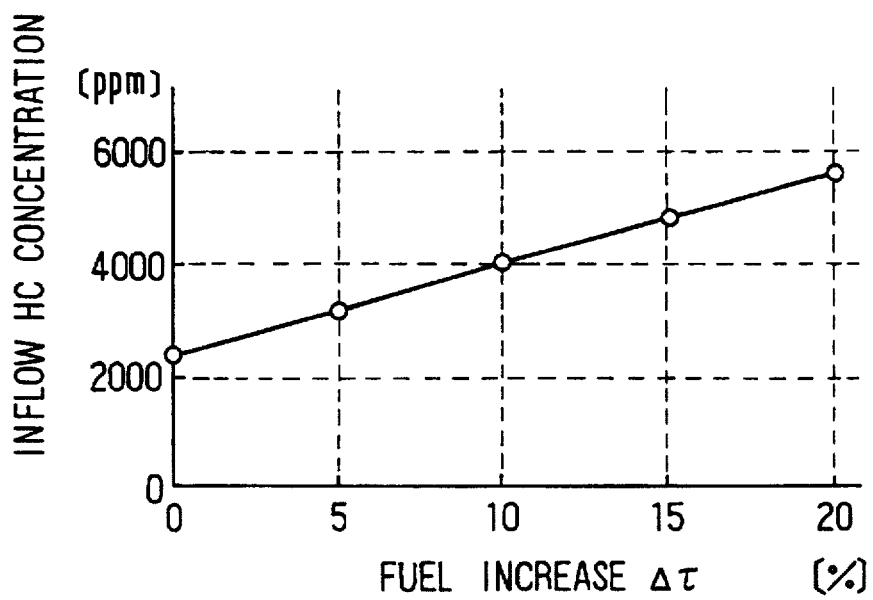
FIG. 7 is a characteristic diagram plotting an intake gas HC concentration against a fuel injection increase to be used in the exhaust gas purification system.

From FIG. 7 showing a relation between the fuel injection increase $\Delta \tau$ and the HC concentration of the exhaust gas to flow into the catalytic converter 4, the relation of (the increase in the HC concentration due to the fuel injection increase $\Delta \tau$)< (the reduction in the HC emission due to the improvement in the HC purification factor $\eta$ of the catalytic converter 4) has to be satisfied so that the HC emission may be reduced by increase control of the fuel injection rate.

Here, the relation between the inflow gas HC concentration [HC]in and the outflow gas HC concentration [HC]out at the time of passing through the catalytic converter 4 is expressed by the following formula (4):

$$[HC]in \, (1\eta) = [HC]out \tag{4}.$$

Figure 8:
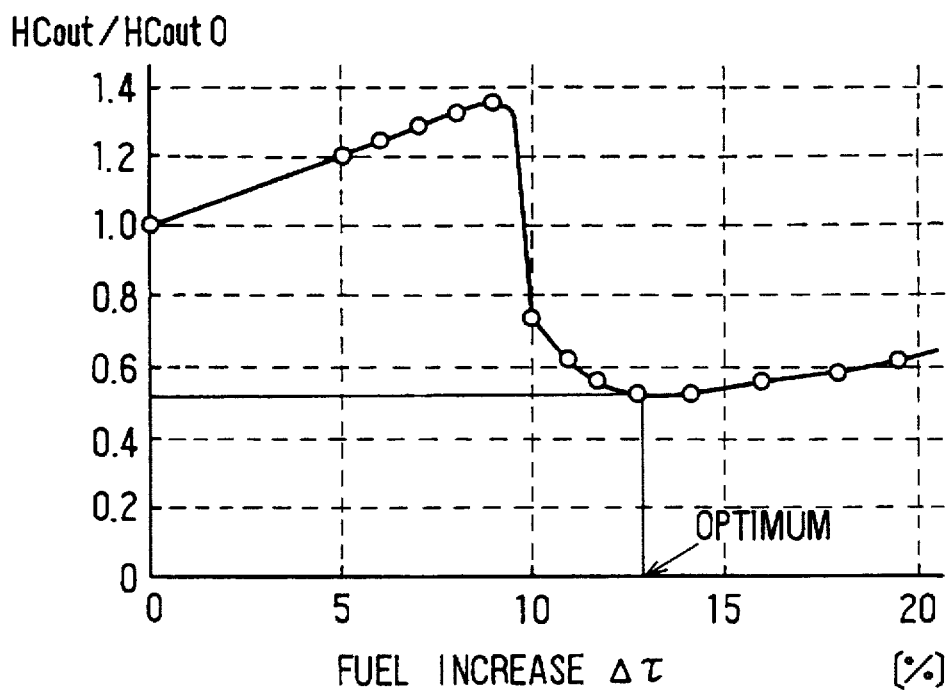
FIG. 8 is a characteristic diagram plotting an HC emission ratio against a fuel injection increase to be used in the exhaust gas purification system.

If the relation of FIG. 6 between the fuel injection increase $\Delta \tau$ and HC purification factor $\eta$ and the relation of FIG. 7 between the fuel injection increase $\Delta \tau$ and the inflow gas HC concentration [HC]in are applied to the HC purification factor $\eta$ and the inflow gas HC concentration [HC]in of the above formula (4), the outflow HC concentration [HC]out can be expressed only by the fuel injection increase $\Delta \tau$, as illustrated in FIG. 8. In FIG. 8, a dimensionless value is employed as the HC emission ratio ([HC]out/[HC]out0), i.e., the ratio of the outflow HC concentration [HC]out for the fuel injection increase $\Delta \tau > 0$ (for a fuel injection increase) to the outflow gas HC concentration [HC]out0for the fuel injection increase $\Delta \tau = 0$ (for no fuel injection increase). It is apparently seen from FIG. 8 that the HC emission ratio when the fuel injection increase $\Delta \tau$ is about 13% takes the minimum, which is reduced by 40% or more from that for no fuel injection increase ($\Delta \tau = 0$).

By optimizing the fuel injection increase to activate the catalytic converter 4 positively with the heat of reaction, as described above, the HC emission can be reduced as a whole. Although the optimization of the HC in the exhaust gas has been described in the present embodiment, a similar optimization can be effected for the Co.

Figure 9A:
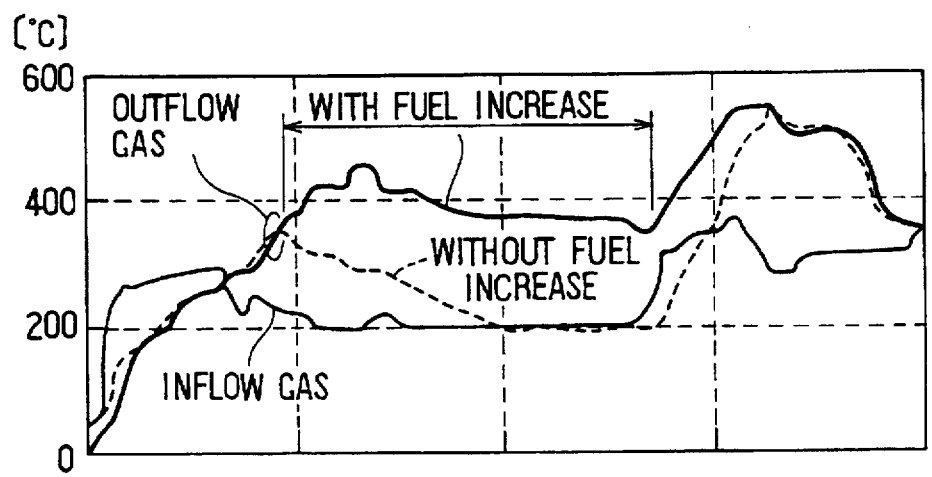
FIGS. 9A and 9B are state transition diagrams plotting an exhaust gas temperature and an HC concentration when a fuel injection increasing control is executed by applying the exhaust gas purification system.
Figure 9B:
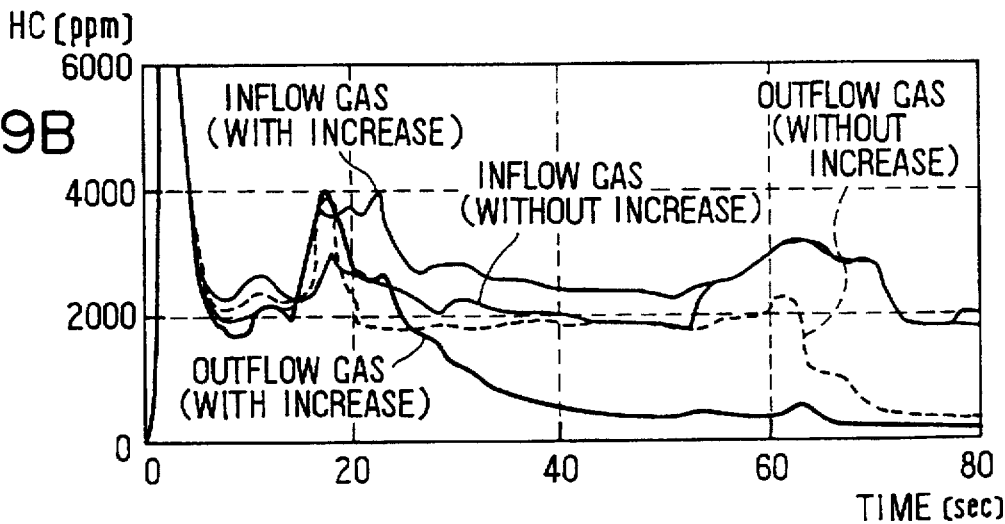

FIGS. 9A and 9B show state transitions produced by the optimization confirming tests by applying the control of the fuel injection increase in the exhaust gas purification system of the present embodiment to an actual internal combustion engine. It is apparent from FIGS. 9A and 9B that the outflow gas temperature drops for no fuel injection increase once it exceeds the activation temperature of the catalyst but that the activated state can be kept from about 19 seconds after the start of the partial activation of the catalytic converter 4 even in the subsequent low speed/load running condition. It is further seen that the HC concentration for the outflow gas at the fuel injection increase time is accordingly far lower than that for no fuel injection increase thereby to retain the satisfactory exhaust gas purification.

Next, the routine of the fuel injection rate increasing process in the ECU 12, as used in the exhaust gas purification system for the internal combustion engine according to the present embodiment, will be described with reference to the flow chart of FIG. 10.

First of all, the running state of the internal combustion engine 1 is detected at step S101 on the basis of the read signals including an engine speed NE, an intake air flow QA, an intake pressure PM, a throttle opening TA, a cooling water temperature THW or other signals of the internal combustion engine 1. Then, the routine advances to step S102, at which it is decided whether or not the cooling water temperature THW is below a predetermined temperature Ts corresponding to the cold start of the engine. If the determination result at step S102 is NO or if it is not at the cold start, the present routine is ended. If the determination at step S102 is YES indicating the cold start, on the other hand, the routine advances to step S103, at which it is determined whether or not a starter flag indicating the engine start state is XSTA=0. If the determination at step S103 is NO indicating the starting state, the present routine is ended.

If the determination at step S103 is YES indicating that the cranking of the engine is completed, on the other hand, the routine advances to step S104, at which it is determined on the basis of the detected signal of the exhaust temperature sensor 7 whether or not an exhaust gas temperature Te is below a predetermined temperature Ts1 sufficient for keeping the activated state of the catalytic converter 4. If the determination at step S104 is NO indicating so that the exhaust gas temperature Te exceeds the predetermined temperature Ts1, the present routine is ended.

If the determination at step S104 is YES indicating that the exhaust gas temperature Te is below the predetermined temperature Ts1, on the other hand, the routine advances to step S105, at which it is determined whether or not an idle flag indicating the idle state of the internal combustion engine 1, is XIDL=1. If the determination at step S105 is YES, the routine advances to step S106, at which it is determined whether or not a vehicle speed SPD is below a predetermined speed Vs (e.g., Vs=2 Km/h) so as to determine whether or not the vehicle is in a stop state. If the determination at step S106 is satisfied, the routine advances to step S107, at which it is determined whether or not a timer counter CSTA counting an after-start time is below a predetermined value t1 (e.g., t1=15 seconds) so as to determine whether or not a predetermined time period for activating the catalytic converter 4 partially after the completion of engine start is elapsed.

Here, if the determination at step S107 is YES, as exemplified by the idle state of the internal combustion engine 1, the stop state of the vehicle and the inactivated state of the catalytic converter 4, the routine advances to step S108, at which the ignition angle delaying control and the idle speed raising control are executed to effect the early warming-up control of the catalytic converter 4. Thereafter, the routine advances to step S109, at which it is determined whether the exhaust gas temperature Te has risen to a predetermined temperature Ts2 (Ts2<Ts1) at which the influence of the cooling by feeding the secondary air can be ignored. If the determination at step S109 is YES, the routine advances to step S110, at which the air pump 9 is driven by the electric motor 8 to feed the secondary air through the secondary air feed port 10 to the inside of the exhaust manifold 2, and the present routine is ended. Here, if the determination at step S109 is NO, the operation of step S110 is skipped.

If any of the determinations at steps S105, S106 and S107 is not satisfied, the routine advances to step S111, at which it is determined whether the start counter CSTA is over a predetermined value t2 (e.g., t2=80 seconds) which corresponds to a predetermined time period for the largecapacity catalytic converter 5 to be activated generally in its whole area after the engine start completion. If the determination at step S111 is YES, the large-capacity catalytic converter 5 is considered already activated generally in its whole area, and the present routine is ended without any operation by deciding that the drop in the exhaust gas purification, which might otherwise be caused by cooling it with the exhaust gas at a low temperature, is little even in the subsequent low speed/load running state.

Here, if the determination at step S111 is NO indicating that the catalytic converter 4 is activated partially or wholly whereas the catalytic converter 5 is not sufficiently activated, the routine advances to step S112, at which the fuel injection rate increase control is executed in the mode of the present embodiment. The optimum value of the fuel injection increase at this time may be either sequentially calculated by the ECU 12 reading the various signals including the detected signal of the temperature sensor 7 and on the detected engine running state or calculated a map value which is present from the various conditions. Next, the routine advances to step S110, at which the secondary air is fed like before, and the present routine is ended.

Thus, even immediately after the cold start of the internal combustion engine 1, the fuel injection rate is increased to be richer in fuel than the stoichiometric air/fuel ratio to feed the secondary air simultaneously as a portion of the catalytic converter 4 reaches the activation temperature, so that the temperatures of the catalytic converter 4 itself and the exhaust gas can be kept over the activation temperature by the heat of the reaction of the increased fuel in the catalytic converter 4.

Moreover, the small-sized catalytic converter 4 of small heat capacity at the upstream stage is quickly activated even at the cold start of the engine so that it can be kept together with the exhaust gas temperature at the activation temperature of the catalyst, and the catalytic converter 5 of large capacity at the downstream stage can reliably purify the noxious components in the exhaust gas discharged from the internal combustion engine 1.

In the present embodiment, although the temperature sensor 7 is arranged in the vicinity of the exit of the exhaust pipe 3, the temperature sensor 7 may be replaced by a variety of sensors for detecting the running state of the internal combustion engine 1 to estimate the exhaust gas temperature from the information of the various sensors.

Other modifications are also possible without departing from the spirit of the present invention.

What is claimed is:

1. An exhaust gas purification system for an internal combustion engine, comprising:

running state detecting means for detecting the running state of the internal combustion engine on the basis of various parameters of the internal combustion engine;

fuel injection rate calculating means for calculating a fuel injection rate on the basis of the detected running state of said internal combustion engine;

fuel feed means for feeding a fuel to said internal combustion engine on the basis of the fuel injection rate calculated by said fuel injection rate calculating means;

a catalytic converter disposed midway of an exhaust passage of said internal combustion engine for purifying exhaust gas of said internal combustion engine;

target purification factor setting means for setting a predetermined characteristic region in the temperature/purification characteristics of said catalytic converter;

fuel injection rate correcting means for correcting said fuel injection rate calculated by said fuel injection rate calculating means, to increase, if said catalytic converter is outside a predetermined activation region set by said target purification factor setting means in correspondence to the detected running sate;

secondary air feeding means for feeding secondary air into said exhaust passage upstream of said catalytic converter; and secondary air flow controlling means for controlling the feed of said secondary air flow by said secondary air feeding means on the basis of the detected running state of said internal combustion engine, wherein an air/fuel ratio of the exhaust gas to flow into said catalytic converter is kept in the vicinity of the stoichiometric value to have an air excess factor within a range of 1.0 to 1.1.

2. An exhaust gas purification system for an internal combustion engine according to claim 1, wherein:

correction of increase in the fuel injection rate is performed by at least one of a calculation by said fuel injection rate calculating means and said fuel injection rate correcting means and a calculation by a predetermined map value, on the basis of the detected running state of said internal combustion engine; and said secondary air flow is controlled by at least one of sequential control of said secondary air flow controlling means and an estimation from a predetermined map value, on the basis of the detected running state of said internal combustion engine.

3. An exhaust gas purification system for an internal combustion engine according to claim 1, wherein:

said catalytic converter carries, as a catalyst component on a carrier surface thereof, at least one of a noble metal of palladium group, platinum and a noble metal of rhodium group, and mixture or compound thereof.

4. An exhaust gas purification system for an internal combustion engine according to claim 1, wherein:

said catalytic converter includes a small-sized catalytic converter of low heat capacity and a catalytic converter of large capacity arranged just downstream the small-sized catalytic converter.

5. An exhaust gas purification method for an engine having fuel injection means, catalyst means disposed in an exhaust passage and secondary air supply means for the exhaust passage, the method comprising the steps of:

detecting a cold engine start condition from running conditions of the engine;

controlling at least one of ignition and idle rotation speed of the engine during a detection of said cold engine start condition by said detecting step, thereby to raise a temperature of the catalyst;

increasing, after the cold engine start condition, a fuel injection rate by the fuel injection means to supply the engine with fuel mixture richer than a stoichiometric mixture ratio; and supplying the exhaust passage means with a secondary air in relation to an increased fuel injection rate by the increasing step, thereby to cause the secondary air to react with the increased fuel injection rate in the catalyst means, wherein said cold engine start is defined as an inactivation state of the catalyst means and detected by at least an exhaust temperature and a time period of engine starting.

6. A method according to claim 5, further comprising the step of:

limiting the fuel increase and the secondary air supply to a time period sufficient to keep an activated state of the catalyst means.

* * * * *